(12) United States Patent
Lepage et al.

(10) Patent No.: US 6,360,475 B1
(45) Date of Patent: *Mar. 26, 2002

(54) DAMPED FISHING ROD

(75) Inventors: James B. Lepage; Earl D. Duback, both of Ledward; Charles N. Corrado, Jr., Groton, all of CT (US)

(73) Assignee: The Orvis Company, Inc., Manchester, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/481,606

(22) Filed: Jan. 12, 2000

Related U.S. Application Data

(63) Continuation of application No. 08/451,562, filed on May 26, 1995, now Pat. No. 6,092,324.

(51) Int. Cl.$^7$ ................................................ A01K 87/00
(52) U.S. Cl. ............................................ 43/23; 43/18.1
(58) Field of Search ............................... 43/18.1, 18.5, 43/23

(56) References Cited

U.S. PATENT DOCUMENTS

| | | | | |
|---|---|---|---|---|
| 2,456,681 A | * | 12/1948 | Culver | 43/23 |
| 6,092,324 A | * | 7/2000 | Lepage | 43/23 |

FOREIGN PATENT DOCUMENTS

| | | | | |
|---|---|---|---|---|
| AU | 242600 | * | 1/1963 | 43/23 |
| FR | 1091593 | * | 4/1955 | 43/23 |
| FR | 1473295 | * | 2/1967 | 43/23 |
| FR | 2337995 | * | 8/1977 | 43/23 |
| JP | 403290134 A | * | 12/1991 | 43/23 |

* cited by examiner

*Primary Examiner*—Kurt Rowan
(74) *Attorney, Agent, or Firm*—Vickers, Daniels & Young

(57) ABSTRACT

A fishing rod is provided in which unwanted vibration is damped and casting characteristics are improved. Vibration damping elastomeric material is provided as a tapered element within the hollow rod blank near the rod tip and/or as an intervening layer between the rod blank and the rod grip.

40 Claims, 3 Drawing Sheets

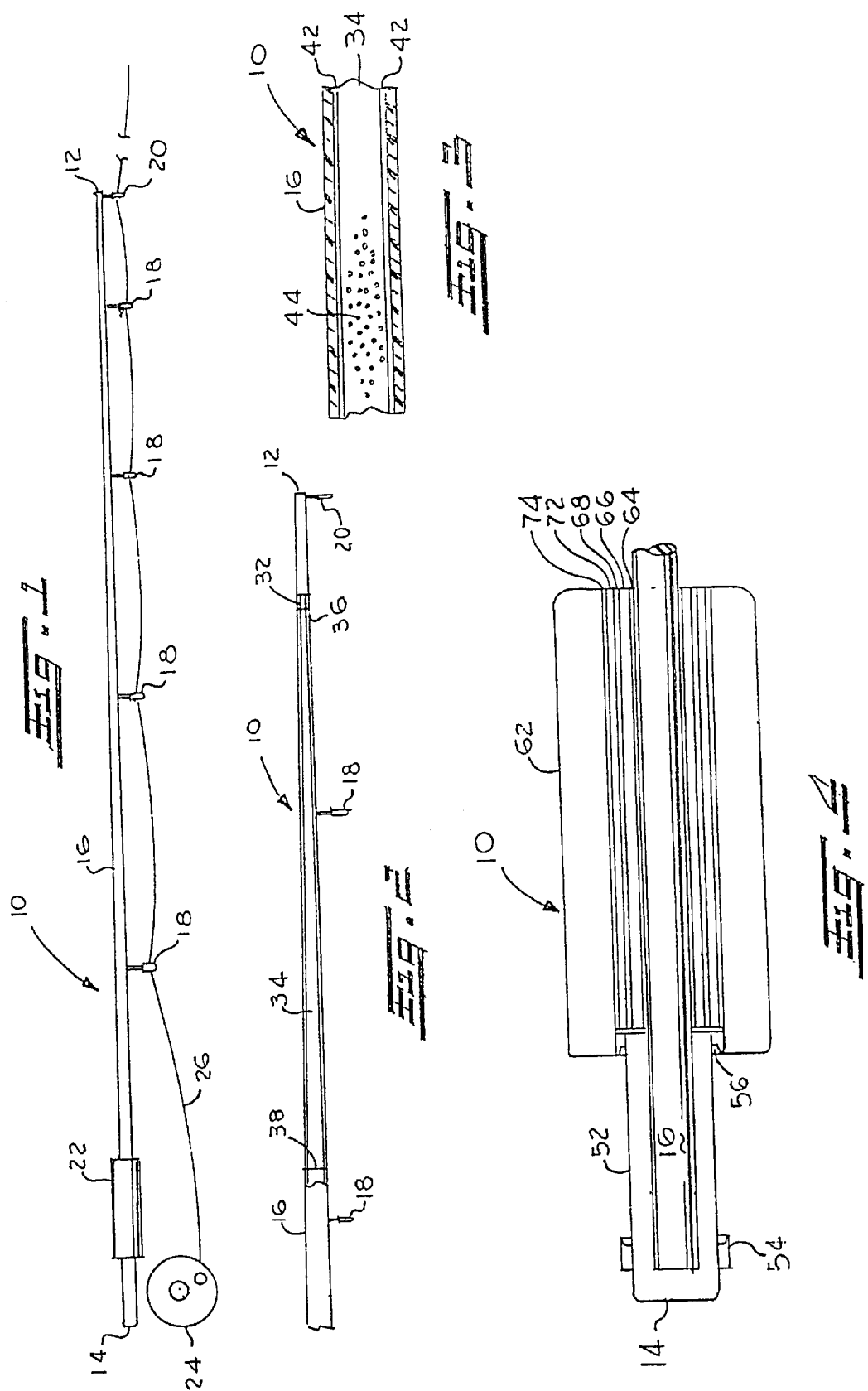

DAMPED FISHING ROD

This patent application is a continuation of application Ser. No. 08/451,562 filed May 26, 1995, now U.S. Pat. No. 6,092,324.

BACKGROUND OF THE INVENTION

The present invention relates in general to fishing rods, and more particularly, to fly fishing rods made from fiber reinforced resin.

Fishing rods have been made from tapered hollow tubes for many, many years. The tapered hollow tubes are called blanks. Most modern fishing rods are made from blanks of fiber reinforced synthetic resin. The blanks taper from a butt end having a larger diameter to a tip end having a smaller diameter. Reel seats, grips, line guides, and tips are mounted on the rod blanks to make a finished fishing rod. Fishing rods and, especially fly fishing rods, are often provided in sections so the rod may be transported in a case less lengthy than the assembled rod.

A typical fly fishing rod includes a grip and a mechanism for mounting a reel near the butt end. A series of line guides are attached to the rod along its length ending at the tip end. Line is fed from the reel through the line guides to the tip. In fly fishing particularly, the flexing characteristics of the rod are very important. The flexing characteristics have a major influence on the ability of a fisherman to cast a fly toward a desired location with a desired presentation upon the water. To improve this flexing characteristic, rod builders have used a wide variety of materials and designs. Bamboo has given way to various synthetic reinforced resins to achieve desirable flex characteristics. The taper and weight of the tube forming the rod blank has also been carefully controlled. As rods in their finished states are often sectional, the design of the joint holding the sections together has been carefully thought out to provide appropriate flexing characteristics. Considerable efforts have been expended in designing and building fly rods to achieve flexing characteristics and thus improve casting. However, the perfect fly rod has yet to be achieved.

SUMMARY OF THE INVENTION

Applicants have found that damping of the vibration characteristics of a fishing rod over a portion of its length improves its casting characteristics. Such damping can be achieved by the insertion of a damping material into the fly rod over a selected portion of its length. The damping material is selected to attenuate and damp vibrations in the rod thereby improving control over the line and the transfer of energy to the line and fly. Thus, in accordance with the invention, a fishing rod is provided having a damping material incorporated into the rod over a portion of its length.

Still further in accordance with the invention, a fishing rod is provided having a damping material incorporated into the rod over a portion of the length near the tip end only.

Further in accordance with the invention, a fishing rod comprising a tapered, hollow, tubular member is provided with a damping element having a gently tapered conical shape adapted to be received snugly within the hollow rod.

Still further in accordance with the invention, a fishing rod is provided with a tapered damping element having a taper identical to the inside taper of the rod near its tip.

Still further in accordance with the invention, a fishing rod having a hollow tapered body portion is provided with a damping element having a taper to match the inside taper of the body portion near its tip end with the damping element being adhesively bound to the inside surface of the body portion over substantially the entire length of the damping member.

Further in accordance with the invention, a fishing rod is provided having a damping element between the rod blank and the rod grip.

Yet further in accordance with the invention, a fishing rod is provided in which a layer of damping material is positioned around the rod blank and encased by a thin hard cylinder within the grip providing a damping action between the rod and the grip.

It is the principal object of the present invention to provide a fishing rod having improved casting characteristics.

It is another object of the present invention to provide a fishing rod which provides improved casting control.

It is still another object of the present invention to provide a fishing rod having good flex characteristics and at the same time vibration damping characteristics allowing the fisherman to achieve longer and more accurate casts.

It is another object of the present invention to provide a fishing rod which efficiently transfers energy to the fishing line.

It is still another object of the present invention to provide a method of manufacturing an improved fishing rod providing improved damping characteristics without interfering with other characteristics of the rod or only minimally changing other characteristics in order to enhance the rod's performance.

These and other objects of the present invention will become evident from the following detailed description taken in conjunction with the accompanying drawings which form a part hereof.

BRIEF DESCRIPTION OF DRAWINGS

FIG. 1 shows schematicly a fly fishing rod;

FIG. 2 shows a portion of the fly fishing rod of FIG. 1 enlarged and partially cut away to reveal a damping element used in the present invention;

FIG. 3 shows a further enlarged portion of the fly fishing rod of FIGS. 1 and 2 showing the damping element in greater detail;

FIG. 4 shows an enlargement of the grip portion of the fly fishing rod of FIG. 1 partially cut away to reveal a second damping element in accordance with the present invention;

DETAILED DESCRIPTION OF THE INVENTION

Figure 5:
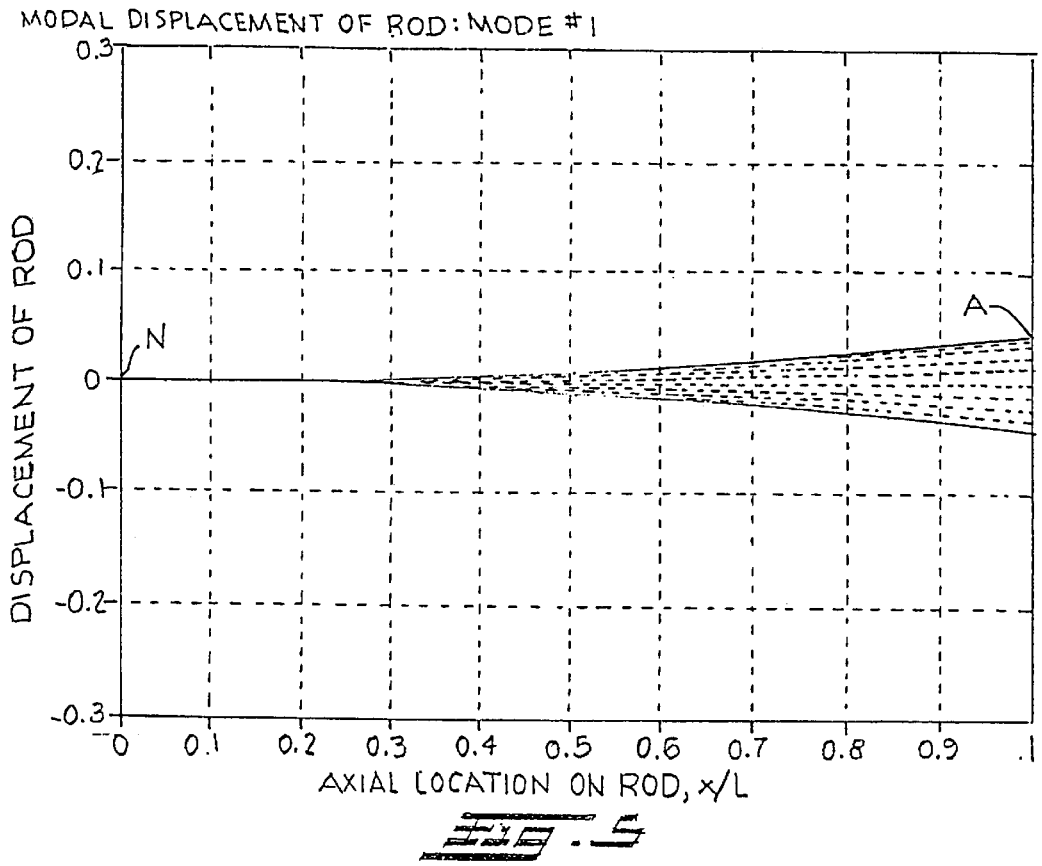
FIG. 5 shows the first mode of vibration of a conventional fly fishing rod.

Referring now to the drawings wherein the showings are made for the purposes of illustrating a preferred embodiment of the invention only and not for the purposes of limiting same, FIG. 1 shows a fly fishing rod 10 having a tip 12 and a butt 14. The fishing rod 10 is built upon a rod blank 16 which tapers from a larger diameter at the butt 14 to a small diameter at the tip 12. The blank 16 is hollow and is fabricated from a reinforcing fiber embedded in a resin. Such rod blanks are available from a number of sources in a wide variety of sizes and actions. Moreover, these rod blanks are available in fitted segments allowing one to disassemble a rod of about 8 to 10 feet into a more manageable portions for transportation.

The fishing rod 10 is also provided with a number of guides 18 along its length and a tip guide 20. A grip 22 is positioned on the rod near the butt end 14. Reel mounting hardware and a reel 24 are also positioned near the butt end 14. A quantity of fly line 26 is contained upon the reel 24 and fed from the reel through the guides 18 and the tip guide 20. All of the above-described elements are conventional and are available as finished assembled fly rods or as individual components for building a fly rod.

The action characteristics of a fly rod describe the flexibility, line handling, and power transfer characteristics of a particular fly rod. Fly rods are made in a wide variety of force carrying capacities and actions. The action of a fly rod has always been somewhat subjectively described as the final test of the action is how it feels in the hands of a fisherman and how it casts the fly line and a fly in real world fishing situations. While not all characteristics of the action of a given rod are fully understood, several factors are known to contribute to how a rod behaves. The stiffness and elasticity of the reinforcing fibers and resin used in creating the rod blank directly impact the feel of the rod. How the rod is tapered over its length affects the feel of the rod. The amount of reinforcing fibers and resin used in the rod affects the feel of the rod. The distribution of weight over the length of the rod affects the feel of the rod. Other characteristics which are less easily quantified or described also affect the feel of a rod. Rod building is still an art and many of the operations in rod building are still carried out by hand by experienced craftsmen.

Applicants have found that the vibrational characteristics of a rod directly and significantly affect its action. Moreover, applicants have found that these vibrational characteristics and the damping thereof can be computer modeled to a usable degree of accuracy. Further, applicants have found that damping materials can be employed to reduce vibration at selected modes of vibration of the rod thereby improving the action characteristics of the rod significantly.

Elastic bodies, such as fishing rods, have natural frequencies of vibrations. The frequencies and manner in which things vibrate are called the modes of vibration. When elastic bodies are struck or given energy in some way, they often respond by vibrating in their natural frequencies or modes. Thus, the bowing of a violin results in vibration of the violin strings in natural modes providing music. In a fishing rod, energy is put into the rod by the action of the fisherman moving the rod back and forth to perform a cast. The desired result is the transfer of the energy to the fishing line in a controlled manner so the fisherman may place the fly upon the water as he desires. Another affect of the introduction of this energy into the rod is the creation of vibration in the rod. This vibration can divert energy from the fishing line, where it is desired, and can also interfere with control of the line.

Figure 6:
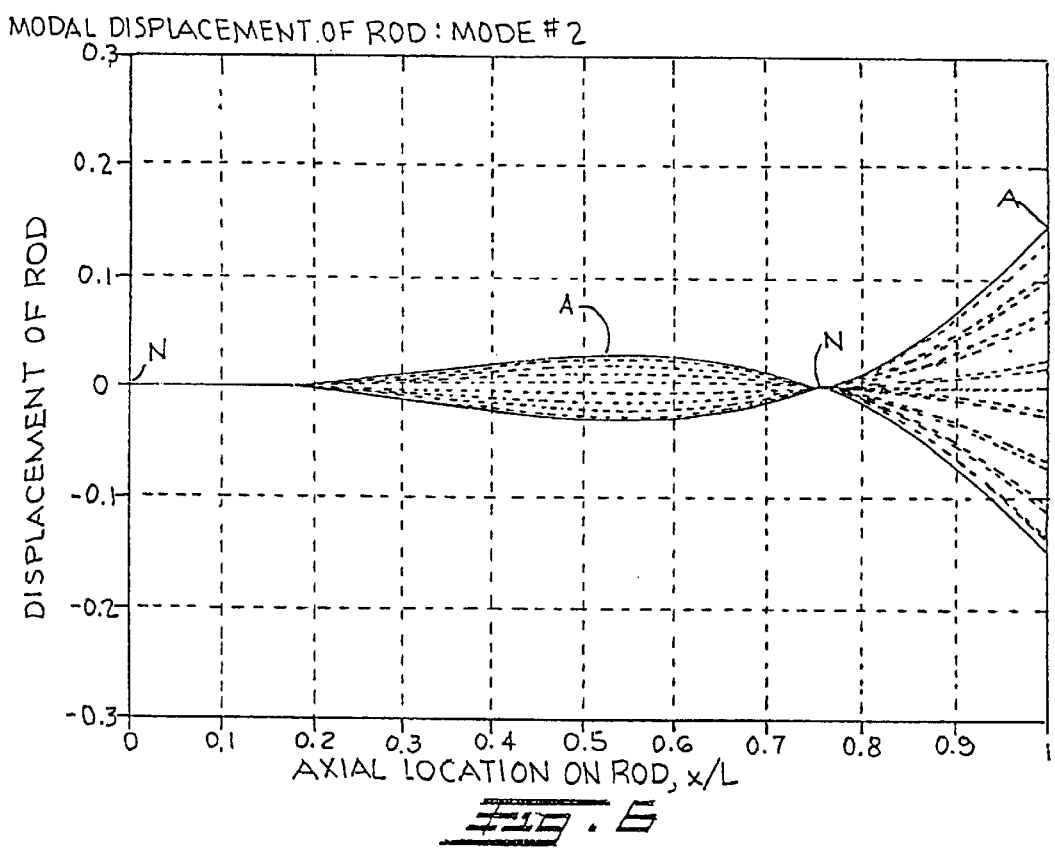
FIG. 6 shows the second mode of vibration of a conventional fly fishing rod.
Figure 7:
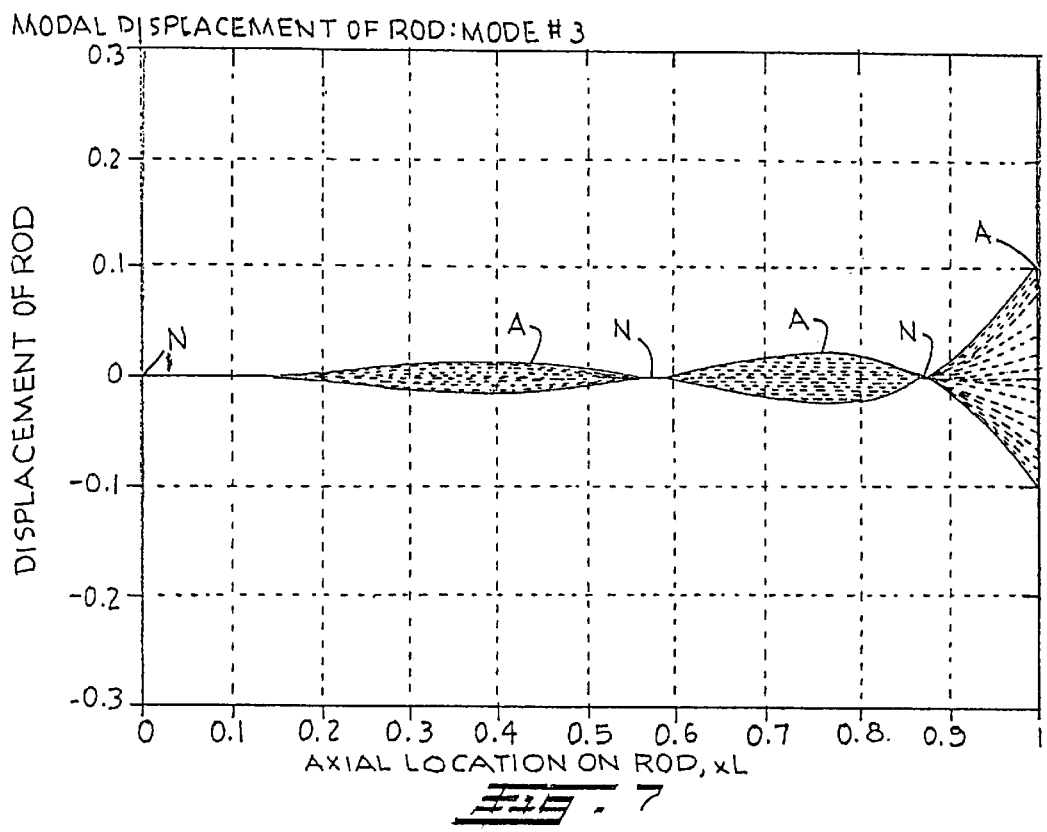
FIG. 7 shows the third mode of vibration of a conventional fly fishing rod.
Figure 8:
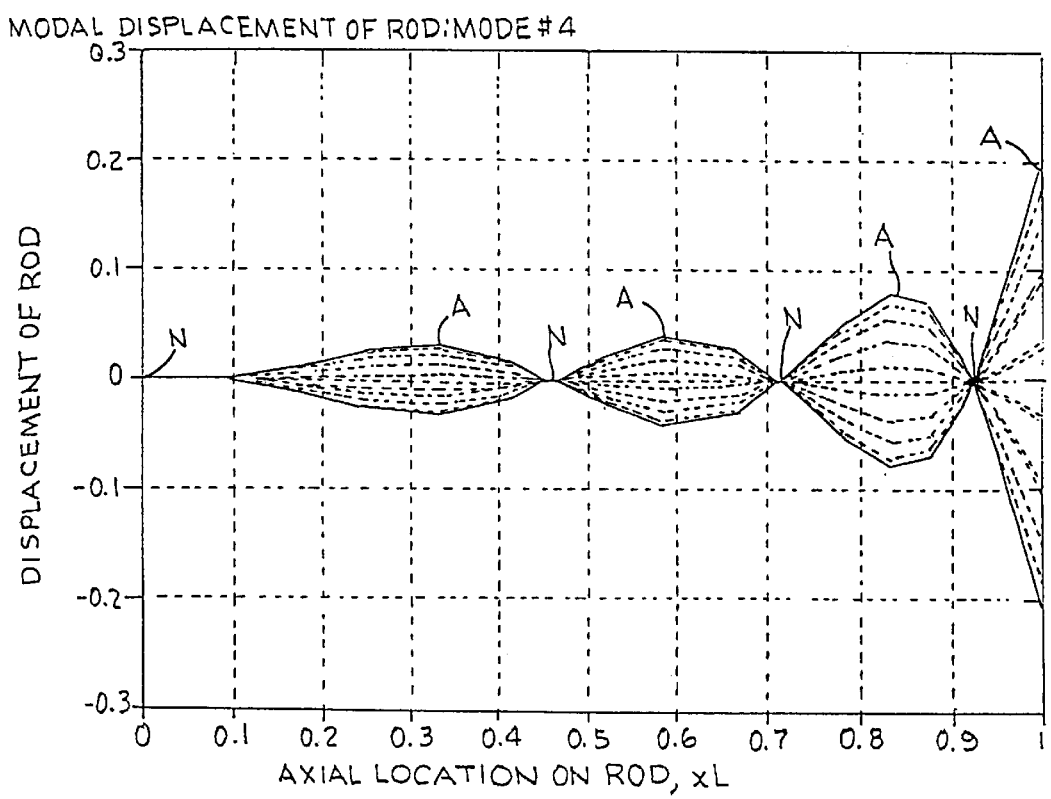
FIG. 8 shows the fourth mode of vibration of a conventional fly fishing rod.

A particular fly fishing rod was modeled numerically and the natural modes vibration of this rod were derived by applicants. The first mode of vibration in which the rod vibrates at approximately 2.65 hertz is illustrated in FIG. 5. In the first mode, the butt end is not displaced appreciably while the tip end is displaced most. The non-displaced location is called a vibrational node and the maximum displacement location is called an antinode. In the first mode, there is one mode and one antinode. A second mode of vibration in which the rod vibrates at approximately 8.93 hertz is shown in FIG. 6. In the second mode, there are two nodes and two antinodes producing a different distribution of displacement along the rod. A third mode of vibration in which the rod vibrates at 17.86 hertz is shown in FIG. 7 and a fourth mode of vibration in which the rod vibrates at 32.73 hertz is shown in FIG. 8. In the third mode, there are three nodes and three antinodes and in the fourth mode, there are four nodes and four antinodes. In the figures nodes are marked with an "N" and antinodes are marked with an "A". These modes of vibrations are the natural modes of vibrations associated with this particular rod. In the figures, the location of motion in the modes of vibration is shown by the numbers across the lower scale. Zero on the far left of each figure is the butt 14 end of the rod. One on the far right of each figure is the tip 12 end of the rod. As can be seen from the figures, the vibration does not really affect the butt end which is held in the fisherman's hand but can result in considerable movement and jitter at the tip end of the rod. The tip end of the rod controls the line as it leaves the rod. The movement of the tip end of the rod has a very important affect on a cast and upon the feel of a rod in casting. When energy is put into the rod, all of the modes of vibration will be occurring at once.

It is expected that other fly rods will vibrate in the four modes described above. The frequencies of these modes will change due to rod weight, length, stiffness, and other factors. The expected frequency ranges are approximately:

First Mode—2–6 hertz

Second Mode—7–12 hertz

Third Mode—15–25 hertz

Fourth Mode—28–38 hertz

The frequencies described for the four modes of vibration illustrated in FIGS. 5–8 are low enough so that significant movement of the tip end of the rod occurs in each mode. The rod has time to move the tip over an appreciable distance with respect to the line. Applicants have found that removing or minimizing this vibration, especially at the tip end, greatly improves the casting characteristics and feel of a fly fishing rod.

Referring to FIG. 2, a portion of the rod 10 adjacent to tip 12 is shown. A portion of the rod length 16 is cut away to show construction of the invention. The rod blank 16 is hollow and tapered. The extreme tip 12 is very small in diameter and the internal hollow is often less than ⅛th of an inch in diameter. From the tip 12, the internal hollow becomes gradually larger toward the butt end. Rod blanks are often made by wrapping material about a steel mandrel and the size and taper of the hollow is very precisely known.

A short distance away from the tip 12 of the rod 10 seen in FIG. 2, the near half of the rod blank 16 is shown cut away. A short portion of empty hollow 32 is seen in this cut away portion. The hollow 32 is empty all the way to the tip 12. A damping element 34 is also seen in FIG. 2. The damping element completely fills the hollow 32 for a portion of its length extending from the tip end of the damping element 36 to the butt end of the damping element 38. Applicants have found that adequate damping is achieved by providing a damping element near the tip end of the rod having a length of approximately 27 inches (68.6 cm.). The damping element 34 need not be positioned right at the tip of the rod but can be spaced from the tip of the rod up to approximately 9 inches while still achieving adequate damping.

The length of the damping element 36 stated above will vary from rod model to rod model. A two handed salmon rod having an overall length of about 15 feet will perform but with a longer damping element 36, e.g. forty inches long. A six foot, one ounce, one weight rod will need a damping element of much less length, e.g. twelve inches long. The positioning of the damping element will also vary from particular rod design to particular rod design. The damping element may be spaced from about 1 inch to 20 inches from the rod tip 12.

The damping element 34 and its relationship to the rod blank 16 is shown in greater detail in FIG. 3. The rod blank 16 is shown cut away in cross section. The rod blank 16 tapers slightly toward the tip 12. Contained with the rod blank 16 is the damping element 34. The damping element is fixed in position with respect to the rod blank 16 by a layer of adhesive 42. The rod blank 16 and the damping element 34 will therefore move in unison in all vibrational modes.

Weight is important in the behavior of a fly fishing rod. Moreover, because the tip of the rod moves furthest in casting and the rod flexes more toward the tip than toward the butt, weight near the tip is most important. Thus applicants have found improved casting and flex characteristics are achieved by the rod blank 16 being empty near the tip 12. Moreover, applicants believe that by dispersing microbubbles 44 in the damping element 34, the weight of the damping element can be minimized while maintained adequate vibration damping characteristics. Microbubbles are not used in the present preferred embodiment but may be helpful in some rods.

The damping element 34 is not just an elastomeric body. Rather, it is a body fabricated from an elastomeric material selected to deaden vibrations of the frequency modes described above. An appropriate elastomeric material is available from Globe Rubber Works, 254 Beech Street, Rockland, Mass. 02370. It is identified as Cast Elastomer Compound G4324-00 which is a diamine/isocyanate/synthetic urethane prepolymer having a shore hardness of 93 A, a tensile strength of 6,000 psi, an elongation of 450%, a Young's Modulus of 16,000 psi, a Die C Tear Strength of 370 pli, a Split Tear Strength of 100 pli and a rebound of 48%. Similar materials are available from others. Damping materials have long been available because vibration is a problem in many areas. Particularly sophisticated materials have been developed for use on submarines and are available from defense contractors. Damping material can be obtained in a liquid-like consistency, mixed with microbubbles, cast into the appropriate shape, and cured. Once cured, the finished damping element 34 will have a taper and external dimensions closely matching the internal dimensions of the hollow 32 in the rod blank 16. It has been found that the damping element 34 can be coated with an appropriate adhesive 42 and pushed into the rod blank 16. No special pulling tool or the like is required. The damping element 34 is simply pushed in with a rod of appropriate size and the adhesive is allowed to set. The damping element 34 is then fixed to the rod blank 16 over its entire length and performs its vibration damping function.

The damping element 34 is made by casting polyurethane material in a silicone mold. The silicone mold allows molding and removal of finished parts without use of a mold release. The damping material is fitted into the mold in the liquid state and cured at a temperature of about 250° F. for less than ten minutes. The finished damping elements are removed from the mold ready for coating with a liquid adhesive and insertion into a rod blank.

Use of the above-described damping element 34 has been found to reduce most modes of vibrations significantly. In tests run on actual damped and undamped identical rods, most of the damping modes illustrated in FIGS. 5–8 are significantly reduced. This is accomplished while adding only minimal weight to the rod and minimal loading of the tip. More importantly, blind tests were conducted by allowing experienced fly fishermen and women to compare otherwise identical damped and undamped rods. The damped rod was preferred. The test participants stated they could cast further and more accurately. Fly line loop control was improved. Performance improvement on windy days was noticeable. As wind can induce vibration in a fly rod, this finding confirmed that the damping treatment was a significant improvement.

A second means of decreasing and/or eliminating unwanted vibrations in a fly rod is illustrated in FIG. 4. FIG. 4 shows, schematically, the portion of fly rod 10 as seen in FIG. 1 near the butt 14. A reel seat 52 is mounted over the butt of the rod blank 16 closing the end of the rod blank. A pair of reel bands 54, 56 are mounted on the reel seat 52. One of the reel bands 54, 56 is conventionally mounted on threads or the like (not shown) allowing the bands 54, 56 to be moved relative to one another. The bands 54, 56 are used to mount a reel 24 (FIG. 1) on the reel seat. This reel mounting mechanism is conventional.

Just forward of the reel seat 52 is the grip 62. With respect to fly rods, grips are conventionally constructed from cork and come in a variety of shapes to accommodate the preferences of fishermen. In normal use, a fisherman will handle the fly rod 10 during casting by means of the grip 62 only. Thus, the only portion of the fly rod in contact with a relatively fixed structure is the grip 62 being held in the hand of the fisherman.

The grip 62 surrounds the rod blank 16. A first layer of adhesive 64 is applied to a damping element 66 which is then applied to the rod blank. A second layer of adhesive 68 binds the damping element 66 to a rigid grip liner 72 which is in turn bonded to the grip 62 by a third layer of adhesive 74. The layers seen in FIG. 4 are shown in an exaggerated thickness for purposes of clarity.

The grip liner 72 and the third layer of adhesive 74 prevent the grip 62 from being compressed into the damping element 66 and, more importantly, isolates the grip 62 from the damping element 66. For some rod designs, the grip liner 72 and the third layer adhesive 74 may not be necessary because the grip 62 may have sufficient rigidity to perform this function unassisted. The grip is also isolated from the reel seat so support of the rod is through the grip only.

The rod blank 16 will behave as a somewhat isolated body with respect to vibrations when the rod 10 is used in casting. The grip structure just described acts to damp vibration in the rod 10 and the rod blank 16 as it is a damping member at the only point in which the rod blank 16 is supported by a relatively fixed structure, the angler's hand.

Applicants have found that the relatively small mass of damping material positioned as described between grip 62 and rod blank 66 significantly damps the modes of vibration described above. The layer 66 does not need to be very thick. Applicants currently prefer a layer of about 0.06 inches (1.5 millimeter). Moreover, because the damping material is positioned under the grip, the mass of the damping material does not significantly affect the felt characteristics of the rod. The mass is at the position of the grip as far from the tip as is possible. The tip can be kept light.

Because the damping layer 66 is relatively small in volume and positioned under the grip, microbubbles 44 (seen in FIG. 3) are not needed in the layer 66. Rather, a simple uniform layer of damping material can be used. Microbubbles may be used for weight reduction.

While not readily apparent from FIG. 4, the rod blank 16 has a gradual taper to it even near the butt end. Because of this, it is advantageous to have a gradual taper to all of the layers between the rod length 16 and the grip 62. This provides uniform layer thickness over the length of the handle. This can be accomplished by casting or otherwise forming the damping element 66 and the grip liner 72 to have enlarged interior diameters but otherwise identical tapers to the rod blank 16 near the butt end. Alternatively, the damping element 66 can be cut from sheet material in a trapezoidal form and simply wrapped around the rod blank 16 and adhesively bound to the rod blank with a fine seam at the point where the trapezoidal sides meet one another.

Alternatively, a grip liner 72 of uniform cross section can be used. A hollow conical damping element 66 fills the volume between the rod blank 16 and the grip liner 72. The damping element 66 can be cast in place or, preferably, cast in a fixture and glued in place after curing.

The damping element 66 is fabricated from an elastomeric material selected for appropriate damping characteristics with respect to the modes of vibrations expected. Applicants have found appropriate damping materials to be available from Globe Rubber Works (previously identified) in a liquid form for casting into hollow conical members or into flat sheet form for cutting and adhesive binding to the rod blank 16.

The above-described damping elements 44, 66 can be used as illustrated in conjunction with one another or separately. The damping advantages, while working together, also work independently. One can use either the damping under the grip, 66 the damping within the rod blank near the tip, 34 or both. At present, use of element 44 in the tip alone is preferred. The damping element 44 may be divided into two pieces for use in two sections of multiple section rods.

Another method of providing damping material near the tip 12 of the fishing rod is the coating of the inside surface of the hollow 32 of the rod blank with a layer of curable elastomeric damping material and then allowing the layer to cure. A damping material is selected with appropriate damping characteristics, viscosity, and cure rate. The material is introduced by injection into the rod blank. A coating is formed of appropriate thickness and cures in place. The thickness of the coating can be controlled by selecting an appropriate viscosity for the material Alternatively, the rod blank can be completely filled over a portion of its length. The position of the damping element is controlled by insertion of a dam or block into the blank before introduction of the liquid damping material. Because the rod blank is tapered, a dam of selected site can be pushed into the rod blank to a selected position and will be held in place. Thus, this "cast-in-place" method can be used to position a damping element of selected length at virtually any position in the rod.

The invention has been described with respect to preferred embodiments. Modifications and alterations will occur to others upon the reading and understanding of this specification. It is our intention to include all such modifications and alterations insofar as they come within the scope of the appended claims or the equivalents thereof.

Having thus described the invention, it is claimed:

1. An improvement in a fishing rod having an elongated resilient tube having a stiffness, a plurality of modes of vibration, a tip end and a butt end, a reel seat and a grip, the improvement comprising:

an elastomeric vibration damping element having a substantially uniform thickness, a stiffness substantially less than said stiffness of said tube, and a select frequency, vibration damping range, said damping element surrounding said tube, being positioned between said tube and said grip, and said select frequency range corresponding to at least one of said plurality of modes of vibration.

2. The improved fishing rod of claim 1 wherein said elastomeric vibration damping element is adhesively bonded to said tube.

3. The improvement of claim 1 wherein said grip is isolated from said tube and said reel seat.

4. The improved fishing rod of claim 1 wherein said grip is cork.

5. The improved fishing rod of claim 1 wherein said damping element is fabricated from a sheet of elastomeric material of uniform thickness.

6. The improved fishing rod of claim 1, wherein said damping element is a generally rectangular flat elastomeric sheet of uniform thickness wrapped around said resilient tube.

7. The improved fishing rod of claim 1 wherein said damping element is a generally trapezoidal flat elastomeric sheet of uniform thickness wrapped around said resilient tube.

8. A fishing rod comprised of:

a resilient tube having an outside surface, a tip end, a butt end opposite said tip end, and a plurality of modes of vibration;

a reel seat adjacent said butt end of said tube;

a grip extending along said tube adjacent said reel seat;

an elastomeric vibration damping element;

said butt end of said tube having a butt diameter, said tip end of said tube having a tip diameter, said tube having a taper extending at at least one rod taper angle between said butt end and said tip end such that said butt diameter is larger than said tip diameter; and, said element having a select frequency, vibration damping range, and said range corresponding to at least one of said plurality of modes of vibration.

9. The fishing rod of claim 8, wherein said grip includes a cover portion and liner portion, said liner portion being an elongated tube having an inside surface, an outside surface, a first end adjacent said reel seat, and a second end opposite said first end, said liner portion having a first inside diameter at said first end and a second inside diameter at said second end, said inside surface of said liner portion having a taper extending at a liner taper angle from said first end to said second end such that said first inside diameter is larger than said second inside diameter, said rod and liner taper angles being complementary and defining a uniform, radial gap between said outside surface of said tube and inside surface of said liner portion, and said element being positioned between said tube and said liner portion within said gap.

10. The fishing rod of claim 9, wherein said cover portion is cork.

11. The fishing rod of claim 9, wherein said element is a generally rectangular, flat sheet of uniform thickness wrapped around said outside surface of said tube.

12. The fishing rod of claim 9, wherein said element is a generally trapezoidal, flat sheet of uniform thickness wrapped around said outside surface of said tube.

13. The fishing rod of claim 9, wherein said element is bonded to said tube.

14. The fishing rod of claim 13, wherein said tube and said element are adhesively bonded.

15. The fishing rod of claim 13, wherein said element is a generally rectangular, flat sheet of uniform thickness wrapped around said outside surface of said tube.

16. The fishing rod of claim 13, wherein said element is a generally trapezoidal, flat sheet of uniform thickness wrapped around said outside surface of said tube.

17. The fishing rod of claim 13, wherein said inside surface of said liner portion is bonded to said element.

18. The fishing rod of claim 17, wherein said tube, said element and said liner portion are adhesively bonded.

19. The fishing rod of claim 17, wherein said element is a generally rectangular, flat sheet of uniform thickness wrapped around said outside surface of said tube.

20. The fishing rod of claim 17, wherein said element is a generally trapezoidal, flat sheet of uniform thickness wrapped around said outside surface of said tube.

21. The fishing rod of claim 17, wherein said cover portion of said grip is bonded to said liner portion.

22. The fishing rod of claim 21, wherein said cover portion, said liner portion, said element, and said tube are adhesively bonded.

23. The fishing rod of claim 8, wherein said grip has first end adjacent said reel seat, a second end opposite said first end, a passage centrally extending through said grip between said first and second ends, said passage defining an inside surface having a first inside diameter at said first end and a second inside diameter at said second end, said inside surface having a taper extending at a grip taper angle from said first end to said second end such that said first inside diameter is larger than said second inside diameter, said rod and grip taper angles being complementary and defining a uniform, radial gap between said outside surface of said tube and said inside surface of said grip, and said element being positioned between said tube and said grip within said gap.

24. The fishing rod of claim 23, wherein said cover portion is cork.

25. The fishing rod of claim 23, wherein said element is a generally rectangular, flat sheet of uniform thickness wrapped around said outside surface of said tube.

26. The fishing rod of claim 23, wherein said element is a generally trapezoidal, flat sheet of uniform thickness wrapped around said outside surface of said tube.

27. The fishing rod of claim 23, wherein said element is bonded to said tube.

28. The fishing rod of claim 27, wherein said tube and said element are adhesively bonded.

29. The fishing rod of claim 27, wherein said element is a generally rectangular, flat sheet of uniform thickness wrapped around said outside surface of said tube.

30. The fishing rod of claim 27, wherein said element is a generally trapezoidal, flat sheet of uniform thickness wrapped around said outside surface of said tube.

31. The fishing rod of claim 27, wherein said inside surface of said grip is bonded to said element.

32. The fishing rod of claim 31, wherein said grip, said element, and said tube are adhesively bonded.

33. The fishing rod of claim 31, wherein said element is a generally rectangular, flat sheet of uniform thickness wrapped around said outside surface of said tube.

34. The fishing rod of claim 31, wherein said element is a generally trapezoidal, flat sheet of uniform thickness wrapped around said outside surface of said tube.

35. The fishing rod of claim 8, wherein said grip is isolated from said tube by said element extending radially therebetween.

36. The fishing rod of claim 35, wherein said grip is isolated from said reel seat by an axially extending gap between said element and said reel seat.

37. The fishing rod of claim 8, wherein said element has a substantially uniform thickness.

38. The fishing rod of claim 37, wherein said thickness is approximately $1/16$ of an inch.

39. The fishing rod of claim 37, wherein said element is formed by a rectangular sheet of material.

40. The fishing rod of claim 37, wherein said element is formed by a trapezoidal sheet of material.

* * * * *